(12) United States Patent
McIntosh et al.

(10) Patent No.: US 10,812,660 B2
(45) Date of Patent: *Oct. 20, 2020

(54) METHOD AND APPARATUS FOR IN-EAR CANAL SOUND SUPPRESSION

(71) Applicant: Staton Techiya, LLC, Delray Beach, FL (US)

(72) Inventors: Jason McIntosh, Sugar Hill, GA (US); Marc Boillot, Plantation, FL (US); John Usher, Beer (GB); Steven Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/258,015

(22) Filed: Jan. 25, 2019

(65) Prior Publication Data

US 2019/0158672 A1 May 23, 2019

Related U.S. Application Data

(63) Continuation of application No. 14/943,001, filed on Nov. 16, 2015, now Pat. No. 10,194,032, which is a
(Continued)

(51) Int. Cl.
*H04M 3/56* (2006.01)
*H04R 3/02* (2006.01)
(Continued)

(52) U.S. Cl.
CPC .......... *H04M 3/568* (2013.01); *H04R 1/1016* (2013.01); *H04R 1/1083* (2013.01);
(Continued)

(58) Field of Classification Search
CPC ...... H04M 3/568; H04M 9/08; H04R 1/1016; H04R 3/005; H04R 3/02; H04R 2460/01; H04R 2460/05; H04R 1/1083; H04R 2201/107; H04R 2410/05; H04R 2430/01; H04R 2499/13
(Continued)

(56) References Cited

U.S. PATENT DOCUMENTS 4,809,262 A 2/1989 Klose et al.
5,131,032 A 7/1992 Esaki et al.
(Continued)

*Primary Examiner* — Vivian C Chin
*Assistant Examiner* — Con P Tran
(74) *Attorney, Agent, or Firm* — Akerman LLP; Peter A. Chiabotti; Mammen (Roy) P. Zachariah, Jr.

(57) ABSTRACT

A method and system of conferencing can include the steps of initiating a conference call at a communication device with two or more communication devices and selecting to suppress a voice communication of at least one communication device on the conference call where a modified electronic signal is generated with the selected at least one communication device so that the voice communication from the selected at least one communication device is inaudible. The method or system further includes sending the modified electronic signal to at least one other communication device on the conference call. Other embodiments are disclosed.

20 Claims, 8 Drawing Sheets

Related U.S. Application Data continuation of application No. 12/245,316, filed on Oct. 3, 2008, now Pat. No. 9,191,740, which is a continuation-in-part of application No. 12/115,349, filed on May 5, 2008, now Pat. No. 8,081,780.

(60) Provisional application No. 60/916,271, filed on May 4, 2007.

(51) Int. Cl.
*H04R 1/10* (2006.01)
*H04R 3/00* (2006.01)
*H04M 9/08* (2006.01)

(52) U.S. Cl.
CPC ............... *H04R 3/005* (2013.01); *H04R 3/02* (2013.01); *H04M 9/08* (2013.01); *H04R 2201/107* (2013.01); *H04R 2410/05* (2013.01); *H04R 2430/01* (2013.01); *H04R 2460/01* (2013.01); *H04R 2460/05* (2013.01); *H04R 2499/13* (2013.01)

(58) Field of Classification Search
USPC ... 381/71.1, 95, 71.6, 71.5, 94.1, 94.7, 94.5, 381/74, 58; 379/406.01, 158, 35; 398/40; 455/570, 416, 67.12; 348/14.08, 348/14.09, 14.01
See application file for complete search history.

(56) References Cited

U.S. PATENT DOCUMENTS

| | | |
|---|---|---|
| 5,259,033 A | 11/1993 | Goodings et al. |
| 5,615,256 A * | 3/1997 | Yamashita ............ H04M 1/60 379/390.01 |
| 5,692,059 A | 11/1997 | Kruger |
| 5,796,819 A | 8/1998 | Romesburg |
| 5,963,901 A | 10/1999 | Vanatalo et al. |
| 5,999,828 A | 12/1999 | Sih et al. |
| 6,021,207 A | 2/2000 | Puthuff |
| 6,081,732 A | 6/2000 | Suvanen et al. |
| 6,118,878 A | 9/2000 | Jones |
| 6,169,912 B1 | 1/2001 | Zuckerman |
| 6,304,648 B1 | 10/2001 | Chang |
| 6,381,572 B1 | 4/2002 | Ishimitsu et al. |
| 6,466,666 B1 | 10/2002 | Eriksson |
| 6,570,985 B1 | 5/2003 | Romesburg |
| 6,631,196 B1 | 10/2003 | Taenzer et al. |
| 6,647,368 B2 | 11/2003 | Nemirovski |
| 6,728,385 B2 | 4/2004 | Kvalo |
| 6,738,482 B1 | 5/2004 | Jaber |
| 6,754,359 B1 | 6/2004 | Svean et al. |
| 6,760,453 B1 | 7/2004 | Banno |
| 6,870,807 B1 | 3/2005 | Chan et al. |
| 7,003,097 B2 | 2/2006 | Marchok et al. |
| 7,039,195 B1 | 5/2006 | Svean et al. |
| 7,236,580 B1 | 6/2007 | Sarkar et al. |
| 7,349,353 B2 | 3/2008 | Guduru et al. |
| 7,403,608 B2 | 7/2008 | Auvray et al. |
| 7,783,054 B2 | 8/2010 | Ringlstetter et al. |
| 7,817,803 B2 | 10/2010 | Goldstein |
| 7,986,802 B2 | 7/2011 | Ziller |
| 3,027,481 A1 | 9/2011 | Beard |
| 8,060,366 B1 | 11/2011 | Maganti et al. |
| 8,081,780 B2 | 12/2011 | Goldstein et al. |
| 8,275,145 B2 | 9/2012 | Buck et al. |
| 8,380,521 B1 | 2/2013 | Maganti et al. |
| 8,401,178 B2 | 3/2013 | Chen et al. |
| 8,838,184 B2 | 9/2014 | Burnett et al. |
| 2001/0046304 A1 | 11/2001 | Rast |
| 2003/0112947 A1 | 6/2003 | Cohen |
| 2004/0137969 A1 | 7/2004 | Nassimi |
| 2004/0202340 A1 | 10/2004 | Armstrong et al. |
| 2005/0058313 A1 | 3/2005 | Victorian et al. |
| 2005/0069161 A1 | 3/2005 | Kaltenbach et al. |
| 2005/0102133 A1 | 5/2005 | Rees |
| 2006/0062395 A1 | 3/2006 | Klayman et al. |
| 2006/0067512 A1 | 3/2006 | Boillot et al. |
| 2007/0036342 A1 | 2/2007 | Boillot et al. |
| 2007/0189544 A1 | 6/2007 | Rosenberg |
| 2007/0291953 A1 | 12/2007 | Ngia et al. |
| 2008/0019539 A1 | 1/2008 | Patel et al. |
| 2008/0037801 A1 | 2/2008 | Alves et al. |
| 2009/0010444 A1 | 1/2009 | Goldstein et al. |
| 2009/0034748 A1 | 2/2009 | Sibbald |
| 2009/0147966 A1 | 6/2009 | McIntosh et al. |
| 2012/0184337 A1 | 7/2012 | Burnett et al. |
| 2013/0051543 A1 | 2/2013 | McDysan et al. |
| 2014/0370838 A1 | 12/2014 | Kim |
| 2015/0288823 A1 | 10/2015 | Burnett et al. |

* cited by examiner

METHOD AND APPARATUS FOR IN-EAR CANAL SOUND SUPPRESSION

CROSS-REFERENCE TO RELATED APPLICATION(S)

This application is a Continuation of U.S. patent application Ser. No. 14/943,001, filed on Nov. 16, 2015, which is a Continuation of U.S. patent application Ser. No. 12/245,316, filed on Oct. 3, 2008, now U.S. Pat. No. 9,191,740, which is a Continuation-In-Part of U.S. patent application Ser. No. 12/115,349, filed on May 5, 2008, now U.S. Pat. No. 8,081,780, which claims the priority benefit of U.S. Provisional Application Ser. No. 60/916,271, filed on May 4, 2007, the entire disclosure of which is incorporated herein by reference. This application is also related to U.S. patent application Ser. No. 12/110,773, filed on Apr. 28, 2008, now U.S. Pat. No. 8,577,062, which claims the priority benefit of U.S. Provisional Application Ser. No. 60/914,318, filed Apr. 27, 2007, the entire disclosure of which is incorporated herein by reference. This application is also related to U.S. patent application Ser. No. 12/170,171, filed on Jul. 9, 2008, now U.S. Pat. No. 8,526,645, the entire disclosure of which is incorporated herein by reference.

FIELD OF THE INVENTION

The present invention pertains to sound reproduction, sound recording, audio communications and hearing protection using earphone devices designed to provide variable acoustical isolation from ambient sounds while being able to audition both environmental and desired audio stimuli. Particularly, the present invention describes a method and device for suppressing echo in an ear-canal when capturing a user's voice when using an ambient sound microphone and an ear canal microphone.

BACKGROUND OF THE INVENTION

People use headsets or earpieces primarily for voice communications and music listening enjoyment. A headset or earpiece generally includes a microphone and a speaker for allowing the user to speak and listen. An ambient sound microphone mounted on the earpiece can capture ambient sounds in the environment; sounds that can include the user's voice. An ear canal microphone mounted internally on the earpiece can capture voice within the ear canal; sounds generated when the user is speaking.

An earpiece that provides sufficient occlusion can utilize both the ambient sound microphone and the ear canal microphone to enhance the user's voice. An ear canal receiver mounted internal to the ear canal can loopback sound captured at the ambient sound microphone or the ear canal microphone to allow the user to listen to captured sound. If the earpiece is however not properly sealed within the ear canal, the ambient sounds can leak through into the ear canal and create an echo feedback condition with the ear canal microphone and ear canal receiver. In such cases, the feedback loop can generate an annoying "howling" sound that degrades the quality of the voice communication and listening experience.

SUMMARY

In a first embodiment, a method of listening to music or other media content during a full duplex communication event, the method comprising the steps of delivering audio content to an ear canal of a first user by way of an Ear Canal Receiver (ECR) to produce an acoustic audio content where the audio content includes music or other media content, capturing in the ear canal of the first user by way of an Ear Canal Microphone (ECM) an electronic signal comprising the acoustic audio content and a spoken voice of the first user in the presence of the audio content delivered to the ear canal, suppressing the audio content in the electronic signal while preserving the spoken voice to produce a modified electronic signal, and sending the modified electronic signal to at least one other user so that the audio content is sufficiently inaudible and the spoken voice is audible during the full duplex communication.

In a second embodiment, a method of conferencing, the method comprising the steps of initiating a conference call with two or more people, selecting to suppress the voice communication of at least one person on the conference call where a modified electronic signal is generated with the selected at least one person voice communication being inaudible, and sending the modified electronic signal to at least one other person on the conference call.

In a third embodiment, a method of listening to audio content comprising the steps of listening to audio content from a transducer coupled to a communication device, engaging in a full duplex voice communication with the communication device where the voice communication and the audio content is output by the transducer, and suppressing the audio content from a transmitted signal from the communication device such that participants receiving the transmitted signal hear a spoken voice of a user of the communication device but the audio content is inaudible.

DETAILED DESCRIPTION OF THE DRAWINGS

Figure 1:
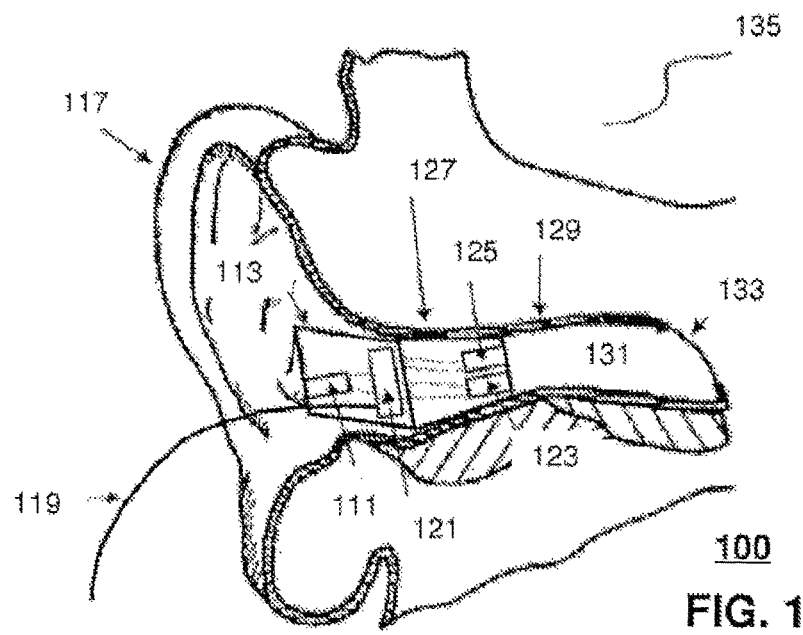
FIG. 1 is a pictorial diagram of an earpiece in accordance with an exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication and use of transducers.

In all of the examples illustrated and discussed herein, any specific values, for example the sound pressure level change, should be interpreted to be illustrative only and non-limiting. Thus, other examples of the exemplary embodiments could have different values.

Note that similar reference numerals and letters refer to similar items in the following figures, and thus once an item is defined in one figure, it may not be discussed for following figures.

Note that herein when referring to correcting or preventing an error or damage (e.g., hearing damage), a reduction of the damage or error and/or a correction of the damage or error are intended.

Various embodiments herein provide a method and device for automatically mixing audio signals produced by a pair of microphone signals that monitor a first ambient sound field and a second ear canal sound field, to create a third new mixed signal. An Ambient Sound Microphone (ASM) and an Ear Canal Microphone (ECM) can be housed in an earpiece that forms a seal in the ear of a user. The third mixed signal can be auditioned by the user with an Ear Canal Receiver (ECR) mounted in the earpiece, which creates a sound pressure in the occluded ear canal of the user. A voice activity detector can determine when the user is speaking and control an echo suppressor to suppress associated feedback in the ECR.

When the user engages in a voice communication, the echo suppressor can suppress feedback of the spoken voice from the ECR. The echo suppressor can contain two sets of filter coefficients; a first set that adapts when voice is not present and becomes fixed when voice is present, and a second set that adapts when the first set is fixed. The voice activity detector can discriminate between audible content, such as music, that the user is listening to, and spoken voice generated by the user when engaged in voice communication. The third mixed signal contains primarily the spoken voice captured at the ASM and ECM without echo, and can be transmitted to a remote voice communications system, such as a mobile phone, personal media player, recording device, walkie-talkie radio, etc. Before the ASM and ECM signals are mixed, they can be echo suppressed and subjected to different filters and at optional additional gains. This permits a single earpiece to provide full-duplex voice communication with proper or improper acoustic sealing.

The characteristic responses of the ASM and ECM filters can differ based on characteristics of the background noise and the voice activity level. In some exemplary embodiments, the filter response can depend on the measured Background Noise Level (BNL). A gain of a filtered ASM and a filtered ECM signal can also depend on the BNL. The (BNL) can be calculated using either or both the conditioned ASM and/or ECM signal(s). The BNL can be a slow time weighted average of the level of the ASM and/or ECM signals, and can be weighted using a frequency-weighting system, e.g. to give an A-weighted SPL level (i.e. the high and low frequencies are attenuated before the level of the microphone signals are calculated).

At least one exemplary embodiment of the invention is directed to an earpiece for voice operated control. Reference is made to FIG. 1 in which an earpiece device, generally indicated as earpiece 100, is constructed and operates in accordance with at least one exemplary embodiment of the invention. As illustrated, earpiece 100 depicts an electro-acoustical assembly 113 for an in-the-ear acoustic assembly, as it would typically be placed in the ear canal 131 of a user 135. The earpiece 100 can be an in the ear earpiece, behind the ear earpiece, receiver in the ear, open-fit device, or any other suitable earpiece type. The earpiece 100 can be partially or fully occluded in the ear canal, and is suitable for use with users having healthy or abnormal auditory functioning.

Earpiece 100 includes an Ambient Sound Microphone (ASM) 111 to capture ambient sound, an Ear Canal Receiver (ECR) 125 to deliver audio to an ear canal 131, and an Ear Canal Microphone (ECM) 123 to assess a sound exposure level within the ear canal 131. The earpiece 100 can partially or fully occlude the ear canal 131 to provide various degrees of acoustic isolation. The assembly is designed to be inserted into the user's ear canal 131, and to form an acoustic seal with the walls 129 of the ear canal at a location 127 between the entrance 117 to the ear canal 131 and the tympanic membrane (or ear drum) 133. Such a seal is typically achieved by means of a soft and compliant housing of assembly 113. Such a seal creates a closed cavity 131 of approximately 5 cc between the in-ear assembly 113 and the tympanic membrane 133. As a result of this seal, the ECR (speaker) 125 is able to generate a full range frequency response when reproducing sounds for the user. This seal also serves to significantly reduce the sound pressure level at the user's eardrum 133 resulting from the sound field at the entrance to the ear canal 131. This seal is also a basis for a sound isolating performance of the electro-acoustic assembly 113.

Located adjacent to the ECR 125, is the ECM 123, which is acoustically coupled to the (closed or partially closed) ear canal cavity 131. One of its functions is that of measuring the sound pressure level in the ear canal cavity 131 as a part of testing the hearing acuity of the user as well as confirming the integrity of the acoustic seal and the working condition of the earpiece 100. In one arrangement, the ASM 111 can be housed in the assembly 113 to monitor sound pressure at the entrance to the occluded or partially occluded ear canal. All transducers shown can receive or transmit audio signals to a processor 121 that undertakes audio signal processing and provides a transceiver for audio via the wired or wireless communication path 119.

The earpiece 100 can actively monitor a sound pressure level both inside and outside an ear canal and enhance spatial and timbral sound quality while maintaining supervision to ensure safe sound reproduction levels. The earpiece 100 in various embodiments can conduct listening tests, filter sounds in the environment, monitor warning sounds in the environment, present notification based on identified warning sounds, maintain constant audio content to ambient sound levels, and filter sound in accordance with a Personalized Hearing Level (PHL).

The earpiece 100 can measure ambient sounds in the environment received at the ASM 111. Ambient sounds correspond to sounds within the environment such as the sound of traffic noise, street noise, conversation babble, or any other acoustic sound. Ambient sounds can also correspond to industrial sounds present in an industrial setting, such as factory noise, lifting vehicles, automobiles, and robots to name a few.

The earpiece 100 can generate an Ear Canal Transfer Function (ECTF) to model the ear canal 131 using ECR 125 and ECM 123, as well as an Outer Ear Canal Transfer function (OETF) using ASM 111. For instance, the ECR 125 can deliver an impulse within the ear canal and generate the ECTF via cross correlation of the impulse with the impulse response of the ear canal. The earpiece 100 can also determine a sealing profile with the user's ear to compensate for any leakage. It also includes a Sound Pressure Level Dosimeter to estimate sound exposure and recovery times. This permits the earpiece 100 to safely administer and monitor sound exposure to the ear.

Figure 2:
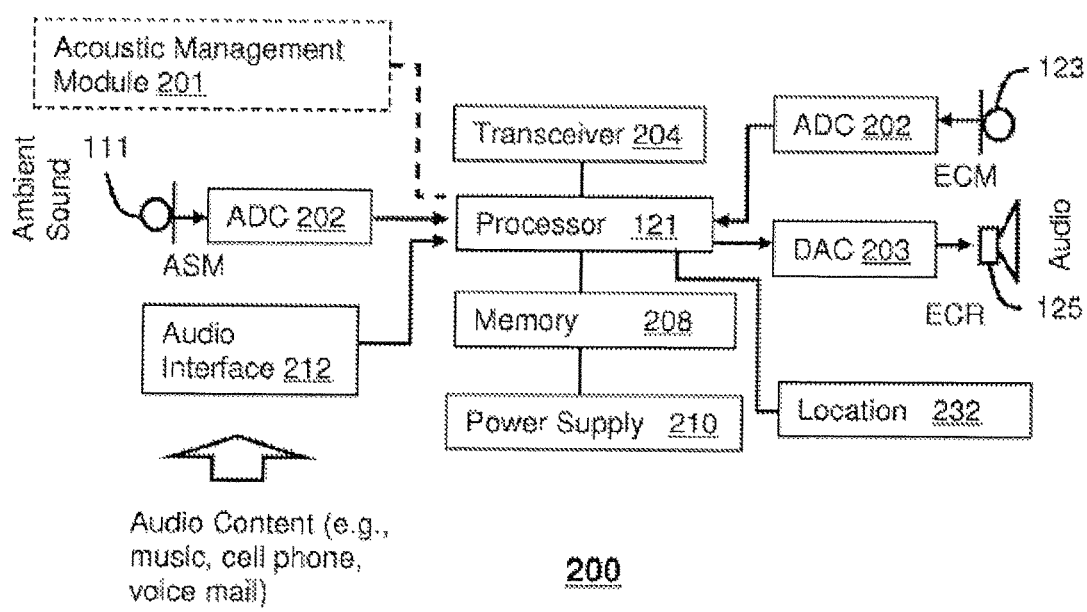
FIG. 2 is a block diagram of the earpiece in accordance with an exemplary embodiment.

Referring to FIG. 2, a block diagram 200 of the earpiece 100 in accordance with an exemplary embodiment is shown. As illustrated, the earpiece 100 can include the processor 121 operatively coupled to the ASM 111, ECR 125, and ECM 123 via one or more Analog to Digital Converters (ADC) 202 and Digital to Analog Converters (DAC) 203. The processor 121 can utilize computing technologies such as a microprocessor, Application Specific Integrated Chip (ASIC), and/or digital signal processor (DSP) with associated storage memory 208 such as Flash, ROM, RAM, SRAM, DRAM or other like technologies for controlling operations of the earpiece device 100. The processor 121 can also include a clock to record a time stamp.

As illustrated, the earpiece 100 can include an acoustic management module 201 to mix sounds captured at the ASM 111 and ECM 123 to produce a mixed signal. The processor 121 can then provide the mixed signal to one or more subsystems, such as a voice recognition system, a voice dictation system, a voice recorder, or any other voice related processor or communication device. The acoustic management module 201 can be a hardware component implemented by discrete or analog electronic components or a software component. In one arrangement, the functionality of the acoustic management module 201 can be provided by way of software, such as program code, assembly language, or machine language.

The memory 208 can also store program instructions for execution on the processor 121 as well as captured audio processing data and filter coefficient data. The memory 208 can be off-chip and external to the processor 121, and include a data buffer to temporarily capture the ambient sound and the internal sound, and a storage memory to save from the data buffer the recent portion of the history in a compressed format responsive to a directive by the processor 121. The data buffer can be a circular buffer that temporarily stores audio sound at a current time point to a previous time point. It should also be noted that the data buffer can in one configuration reside on the processor 121 to provide high speed data access. The storage memory 208 can be non-volatile memory such as SRAM to store captured or compressed audio data.

The earpiece 100 can include an audio interface 212 operatively coupled to the processor 121 and acoustic management module 201 to receive audio content, for example from a media player, cell phone, or any other communication device, and deliver the audio content to the processor 121. The processor 121 responsive to detecting spoken voice from the acoustic management module 201 can adjust the audio content delivered to the ear canal. For instance, the processor 121 (or acoustic management module 201) can lower a volume of the audio content responsive to detecting a spoken voice. The processor 121 by way of the ECM 123 can also actively monitor the sound exposure level inside the ear canal and adjust the audio to within a safe and subjectively optimized listening level range based on voice operating decisions made by the acoustic management module 201.

The earpiece 100 can further include a transceiver 204 that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver 204 can also provide support for dynamic downloading over-the-air to the earpiece 100. It should be noted also that next generation access technologies can also be applied to the present disclosure.

The location receiver 232 can utilize common technology such as a common GPS (Global Positioning System) receiver that can intercept satellite signals and therefrom determine a location fix of the earpiece 100.

The power supply 210 can utilize common power management technologies such as replaceable batteries, supply regulation technologies, and charging system technologies for supplying energy to the components of the earpiece 100 and to facilitate portable applications. A motor (not shown) can be a single supply motor driver coupled to the power supply 210 to improve sensory input via haptic vibration. As an example, the processor 121 can direct the motor to vibrate responsive to an action, such as a detection of a warning sound or an incoming voice call.

The earpiece 100 can further represent a single operational device or a family of devices configured in a master-slave arrangement, for example, a mobile device and an earpiece. In the latter embodiment, the components of the earpiece 100 can be reused in different form factors for the master and slave devices.

Figure 3:
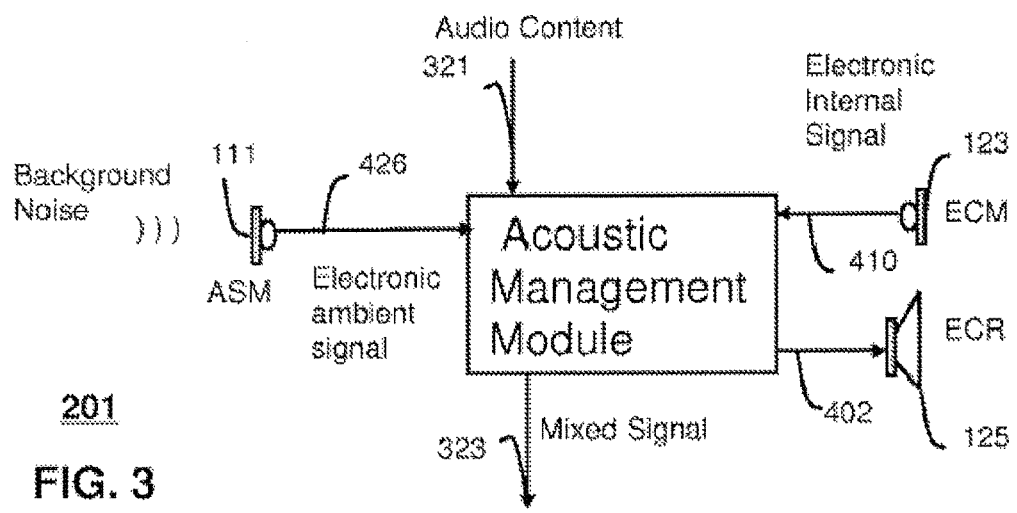
FIG. 3 is a block diagram for an acoustic management module in accordance with an exemplary embodiment.

FIG. 3 is a block diagram of the acoustic management module 201 in accordance with an exemplary embodiment. Briefly, the acoustic management module 201 facilitates monitoring, recording and transmission of user-generated voice (speech) to a voice communication system. User-generated sound is detected with the ASM 111 that monitors a sound field near the entrance to a user's ear, and with the ECM 123 that monitors a sound field in the user's occluded ear canal. A new mixed signal 323 is created by filtering and mixing the ASM and ECM microphone signals. The filtering and mixing process is automatically controlled depending on the background noise level of the ambient sound field to enhance intelligibility of the new mixed signal 323. For instance, when the background noise level is high, the acoustic management module 201 automatically increases the level of the ECM 123 signal relative to the level of the ASM 111 to create the new mixed signal 323. When the background noise level is low, the acoustic management module 201 automatically decreases the level of the ECM 123 signal relative to the level of the ASM 111 to create the new mixed signal 323.

As illustrated, the ASM 111 is configured to capture ambient sound and produce an electronic ambient signal 426, the ECR 125 is configured to pass, process, or play acoustic audio content 402 (e.g., audio content 321, mixed signal 323) to the ear canal, and the ECM 123 is configured to capture internal sound in the ear canal and produce an electronic internal signal 410. The acoustic management module 201 is configured to measure a background noise signal from the electronic ambient signal 426 or the electronic internal signal 410, and mix the electronic ambient signal 426 with the electronic internal signal 410 in a ratio dependent on the background noise signal to produce the mixed signal 323. The acoustic management module 201 filters the electronic ambient signal 426 and the electronic internal 410 signal based on a characteristic of the background noise signal using filter coefficients stored in memory or filter coefficients generated algorithmically.

In practice, the acoustic management module 201 mixes sounds captured at the ASM 111 and the ECM 123 to produce the mixed signal 323 based on characteristics of the background noise in the environment and a voice activity level. The characteristics can be a background noise level, a spectral profile, or an envelope fluctuation. The acoustic management module 201 manages echo feedback conditions affecting the voice activity level when the ASM 111, the ECM 123, and the ECR 125 are used together in a single earpiece for full-duplex communication, when the user is speaking to generate spoken voice (captured by the ASM 111 and ECM 123) and simultaneously listening to audio content (delivered by ECR 125).

In noisy ambient environments, the voice captured at the ASM 111 includes the background noise from the environment, whereas, the internal voice created in the ear canal 131 captured by the ECM 123 has less noise artifacts, since the noise is blocked due to the occlusion of the earpiece 100 in the ear. It should be noted that the background noise can enter the ear canal if the earpiece 100 is not completely sealed. In this case, when speaking, the user's voice can leak through and cause an echo feedback condition that the acoustic management module 201 mitigates.

Figure 4:
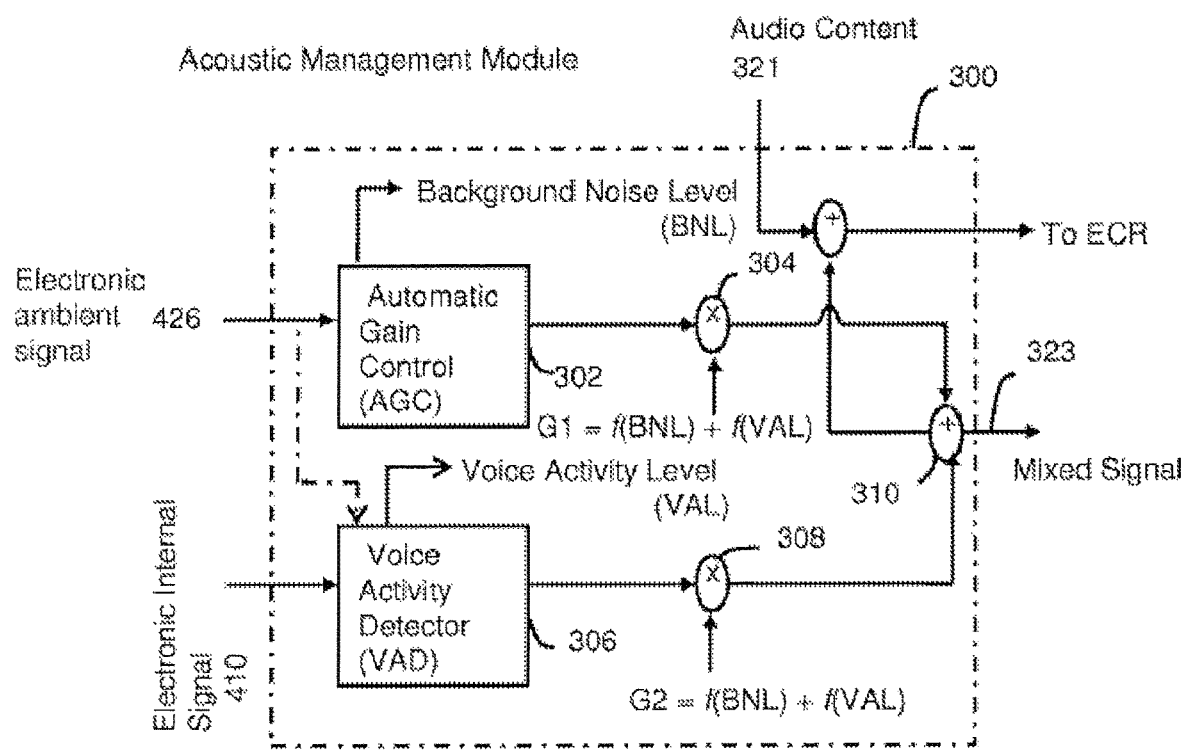
FIG. 4 is a schematic for the acoustic management module of FIG. 3 illustrating a mixing of an external microphone signal with an internal microphone signal as a function of a background noise level and voice activity level in accordance with an exemplary embodiment.

FIG. 4 is a schematic 300 of the acoustic management module 201 illustrating a mixing of the electronic ambient signal 426 with the electronic internal signal 410 as a function of a background noise level (BNL) and a voice activity level (VAL) in accordance with an exemplary embodiment. As illustrated, the acoustic management module 201 includes an Automatic Gain Control (AGC) 302 to measure background noise characteristics. The acoustic management module 201 also includes a Voice Activity Detector (VAD) 306. The VAD 306 can analyze either or both the electronic ambient signal 426 and the electronic internal signal 410 to estimate the VAL. As an example, the VAL can be a numeric range such as 0 to 10 indicating a degree of voicing. For instance, a voiced signal can be predominately periodic due to the periodic vibrations of the vocal cords. A highly voiced signal (e.g., vowel) can be associated with a high level, and a non-voiced signal (e.g., fricative, plosive, consonant) can be associated with a lower level.

The acoustic management module 201 includes a first gain (G1) 304 applied to the AGC processed electronic ambient signal 426. A second gain (G2) 308 is applied to the VAD processed electronic internal signal 410. The acoustic management module 201 applies the first gain (G1) 304 and the second gain (G2) 308 as a function of the background noise level and the voice activity level to produce the mixed signal 323, where $$G1=f(BNL)+f(VAL) \text{ and } G2=f(BNL)+f(VAL)$$

As illustrated, the mixed signal is the sum 310 of the G1 scaled electronic ambient signal and the G2 scaled electronic internal signal. The mixed signal 323 can then be transmitted to a second communication device (e.g. second cell phone, voice recorder, etc.) to receive the enhanced voice signal. The acoustic management module 201 can also play the mixed signal 323 back to the ECR for loopback listening. The loopback allows the user to hear himself or herself when speaking, as though the earpiece 100 and associated occlusion effect were absent. The loopback can also be mixed with the audio content 321 based on the background noise level, the VAL, and audio content level. The acoustic management module 201 can also account for an acoustic attenuation level of the earpiece, and account for the audio content level reproduced by the ECR when measuring background noise characteristics. Echo conditions created as a result of the loopback can be mitigated to ensure that the voice activity level is accurate.

Figure 5:
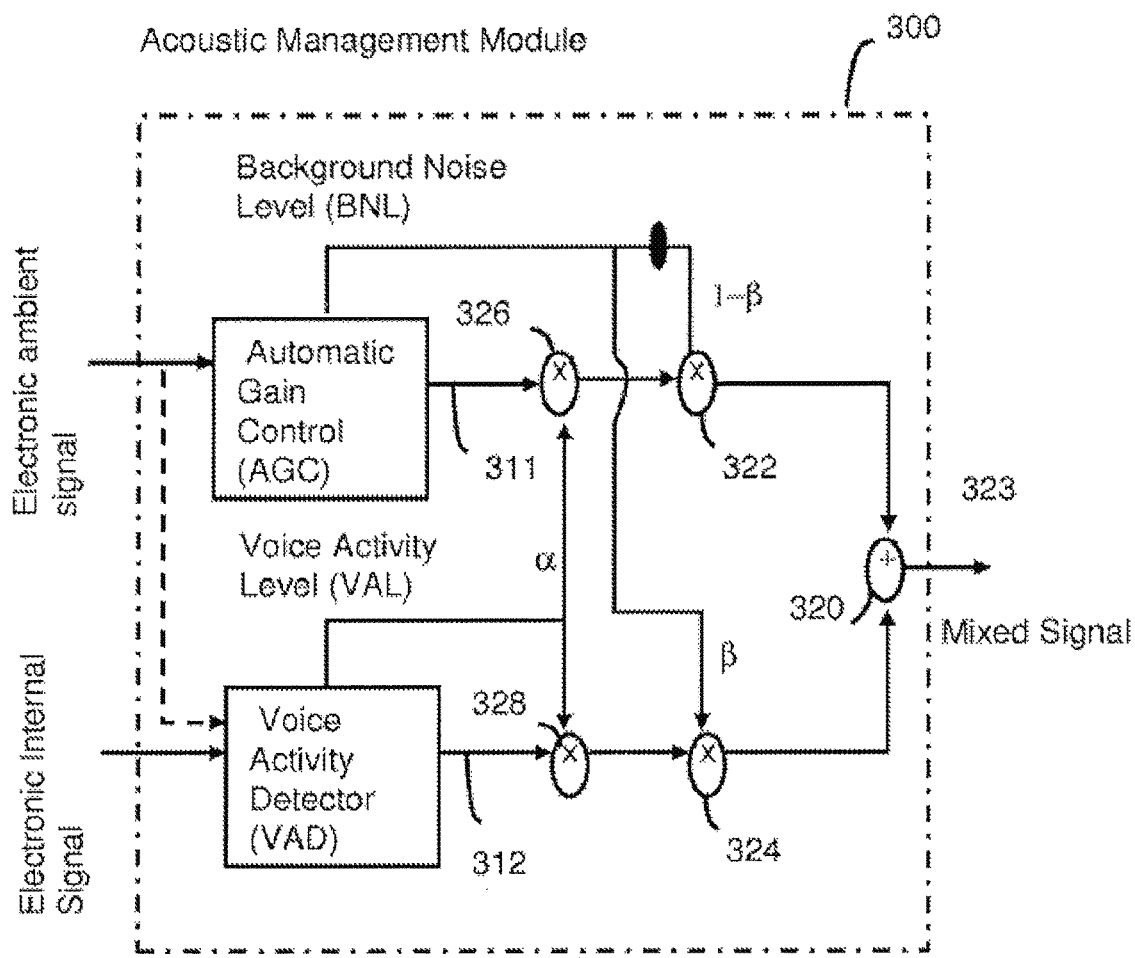
FIG. 5 is a more detailed schematic of the acoustic management module of FIG. 3 illustrating a mixing of an external microphone signal with an internal microphone signal based on a background noise level and voice activity level in accordance with an exemplary embodiment.

FIG. 5 is a more detailed schematic of the acoustic management module 201 illustrating a mixing of an external microphone signal with an internal microphone signal based on a background noise level and voice activity level in accordance with an exemplary embodiment. In particular, the gain blocks for G1 and G2 of FIG. 4 are a function of the BNL and the VAL and are shown in greater detail. As illustrated, the AGC produces a BNL that can be used to set a first gain 322 for the processed electronic ambient signal 311 and a second gain 324 for the processed electronic internal signal 312. For instance, when the BNL is low (<70 dBA), gain 322 is set higher relative to gain 324 so as to amplify the electronic ambient signal 311 in greater proportion than the electronic internal signal 312. When the BNL is high (>85 dBA), gain 322 is set lower relative to gain 324 so as to attenuate the electronic ambient signal 311 in greater proportion than the electronic internal signal 312. The mixing can be performed in accordance with the relation:

Mixed signal=(1−.beta.)*electronic ambient signal+ (.beta.)*electronic internal signal where=(1− .beta.) is an external gain, (.beta.) is an internal gain, and the mixing is performed with 0<.beta.<1.

As illustrated, the VAD produces a VAL that can be used to set a third gain 326 for the processed electronic ambient signal 311 and a fourth gain 328 for the processed electronic internal signal 312. For instance, when the VAL is low (e.g., 0-3), gain 326 and gain 328 are set low so as to attenuate the electronic ambient signal 311 and the electronic internal signal 312 when spoken voice is not detected. When the VAL is high (e.g., 7-10), gain 326 and gain 328 are set high so as to amplify the electronic ambient signal 311 and the electronic internal signal 312 when spoken voice is detected.

The gain scaled processed electronic ambient signal 311 and the gain scaled processed electronic internal signal 312 are then summed at adder 320 to produce the mixed signal 323. The mixed signal 323, as indicated previously, can be transmitted to another communication device, or as loopback to allow the user to hear his or her self.

Figure 6:
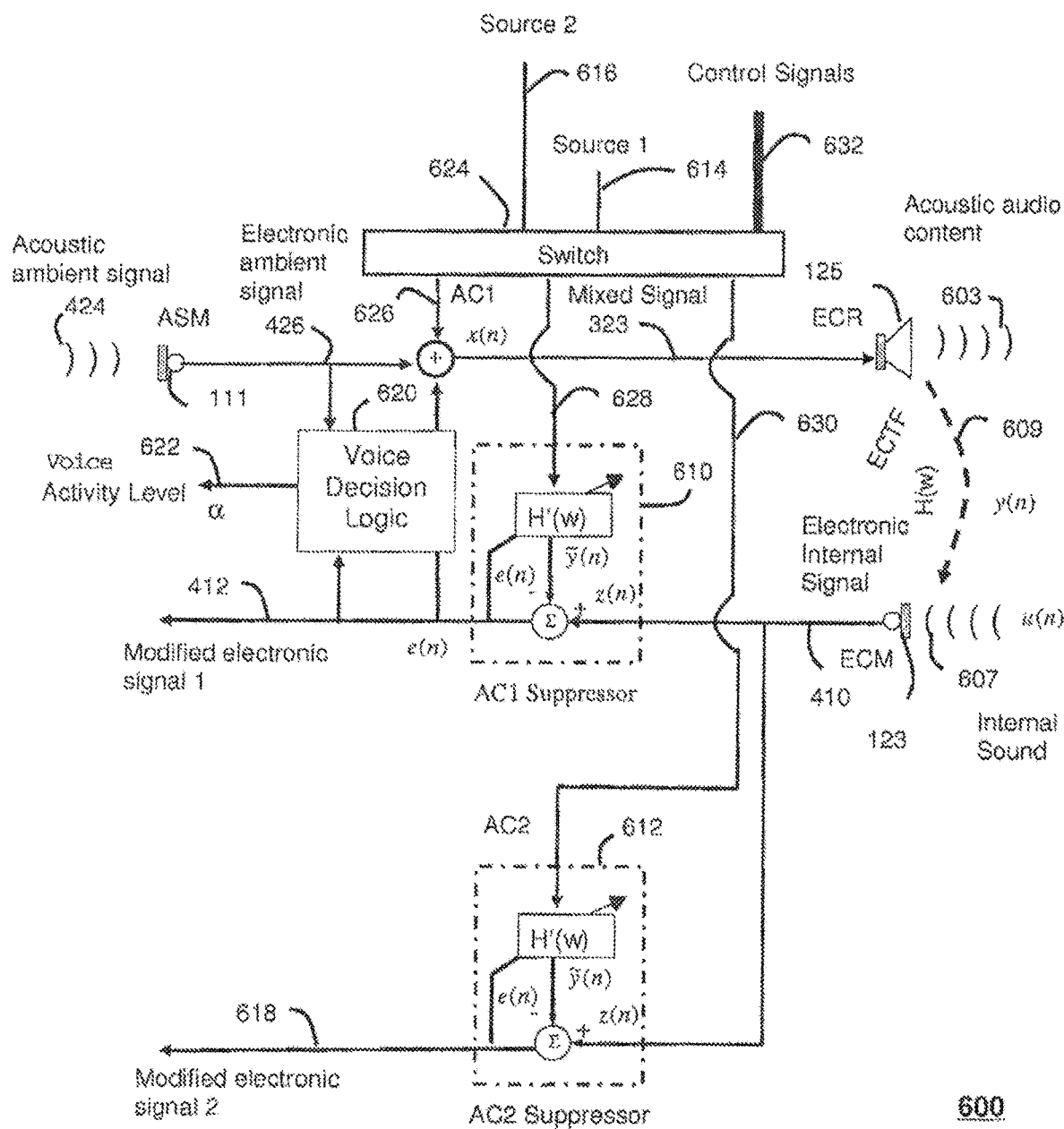
FIG. 6 is a block diagram of a system for generating modified electronic signals in accordance with an exemplary embodiment.

FIG. 6 is an exemplary schematic of an operational unit 600 of the acoustic management module for generating modified electronic signals in accordance with an embodiment. The operational unit 600 may contain more or less than the number of components shown in the schematic. The operational unit 600 can include an adaptive filter 610, an adaptive filter 612, and a voice decision logic 620.

Adaptive filters 610 and 612 can be a Least Mean Squares (LMS) or Normalized Least Mean Squares (NLMS) adaptive filter that models an ear canal transfer function (ECTF) between the ECR 125 and the ECM 123. The adaptive filter 610 generates the modified electronic signal, e(n) 412, which is provided as an input to the voice decision logic 620; e(n) is also termed the error signal e(n) of the adaptive filter 610. In an echo cancellation mode, the error signal e(n) 412 is used to update the filter H(w) to model the ECTF of an echo path. The error signal e(n) 412 closely approximates the user's spoken voice signal u(n) 607 when the echo suppressor 610 accurately models the ECTF.

Alternately, a first reference signal can be provided to adaptive filter 610 and a second reference signal can be provided to adaptive filter 612. For example, a reference signal can be music, media content, or a voice communication signal. The error signal e(n) 412 for adaptive filter 610 or e(n) 618 for adaptive filter 612 is used to update their respective filters H(w) to model the ECTF in the signal path. The error signal e(n) 412 for adaptive filter 610 or e(n) 618 for adaptive filter 612 will closely approximate the corresponding acoustic reference signal as output by ECR 125 and received ECM 123 when adaptive filters 610 and 612 accurately model the ECTF.

In the configuration shown the adaptive filter 610 (and similarly adaptive filter 612) minimizes the error between the filtered signal, {tilde over (y)}(n), and the electronic internal signal, z(n), in an effort to obtain a transfer function H' which is a best approximation to the H(w) (i.e., ECTF). H(w) represents the transfer function of the ear canal and models the echo response. (z(n)=u(n)+y(n)+v(n), where u(n) is the spoken voice or the reference signal that is an internal sound 607, y(n) is the acoustic signal output by ECR 125, and v(n) is background noise (if present, for instance due to improper sealing)).

In the echo cancellation mode, the adaptive filter 610 monitors the mixed signal 323 delivered to the ECR 125 and produces an echo estimate {tilde over (y)}(n) of an echo y(n) 609 based on the captured electronic internal signal 410 and the mixed signal 323. The adaptive filter 610, upon learning the ECTF by an adaptive process, can then suppress the echo y(n) 609 of the acoustic audio content 603 (e.g., output mixed signal 323) in the electronic internal signal z(n) 410. It subtracts the echo estimate {tilde over (y)}(n) from the electronic internal signal 410 to produce the modified electronic internal signal e(n) 412.

It should be noted that more than two adaptive filters could be used to generate multiple modified electronic signals for using with the earpiece or other devices coupled or paired to the earpiece. The circuitry and process disclosed herein is not limited to an earpiece and can be practiced in other communication devices such as a cell phone, smart phone, PDA, laptop computer, radio communication systems, and conferencing systems to name but a few. In a reference suppression mode, a signal or multiple signals are suppressed from at least one device.

Figure 8A:
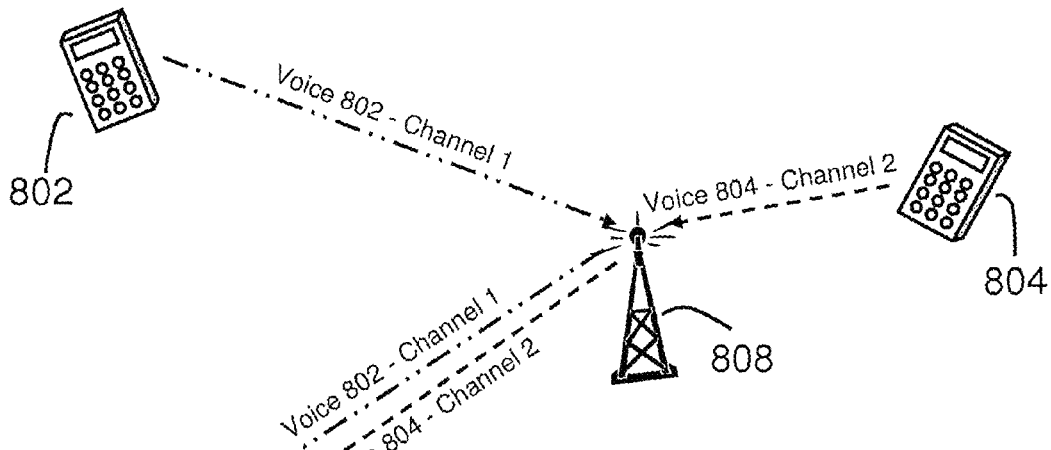
FIGS. 8a-8b are diagrams illustrating a conference call initiated by a user of a communication device in accordance with an exemplary embodiment.
Figure 8A:
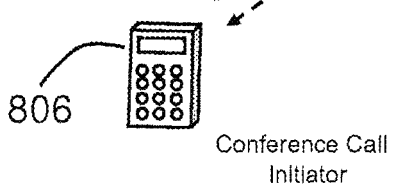

Referring to FIG. 8a, a conference call is initiated by the user of a communication device 806 in accordance with an exemplary embodiment. Communication device 806 is coupled via a network 808 to communication devices 802 and 804. In at least one exemplary embodiment, communication device 806 opens a channel 1 to communicate with device 802 and a channel 2 to communicate with device 804. Thus, device 806 receives voice communication from both devices 802 and 804.

Figure 8B:
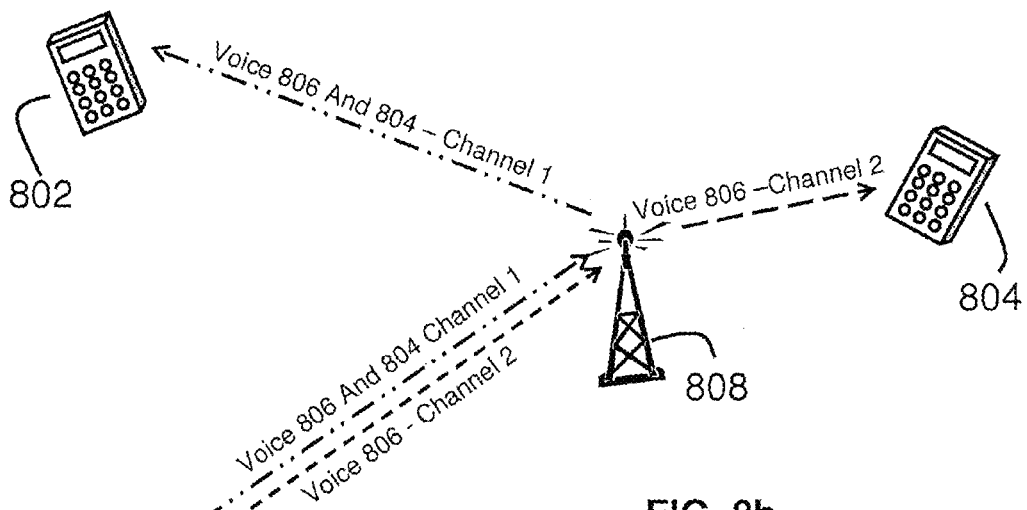
Figure 8B:
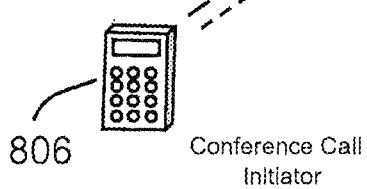

The reference suppression mode allows the initiator of the conference call to selectively suppress the voice communication of one or more participants and to selectively determine which of the participants each person gets to hear. As shown, two participants are engaged in the call. In at least one exemplary embodiment, the conference call initiator pre-selects which caller is suppressed. Referring to FIG. 8b, the conference call initiator has selected that the user of device 804 will not hear the voice of the user of device 802. Thus, the voice communication signal from device 802 is the reference signal for suppression. For example, the users of devices 804 and 806 are in discussion of a business deal. The conference call initiator wants to better understand the implications of the business terms as the dialogue progresses. The user of device 802 is a business associate of the conference call initiator and provides input or comment that can be relevant to the negotiation. The voice communication of the user of device 802 is suppressed by communication device 806 such that only the initiator of the conference call is heard by the user of device 804. The suppressed communication signal is sent to the user of device 804 through channel 2. Conversely, the communication signal sent on channel 1 is not modified allowing the business associate to hear the full conversation while commenting to the conference call initiator.

Figure 9:
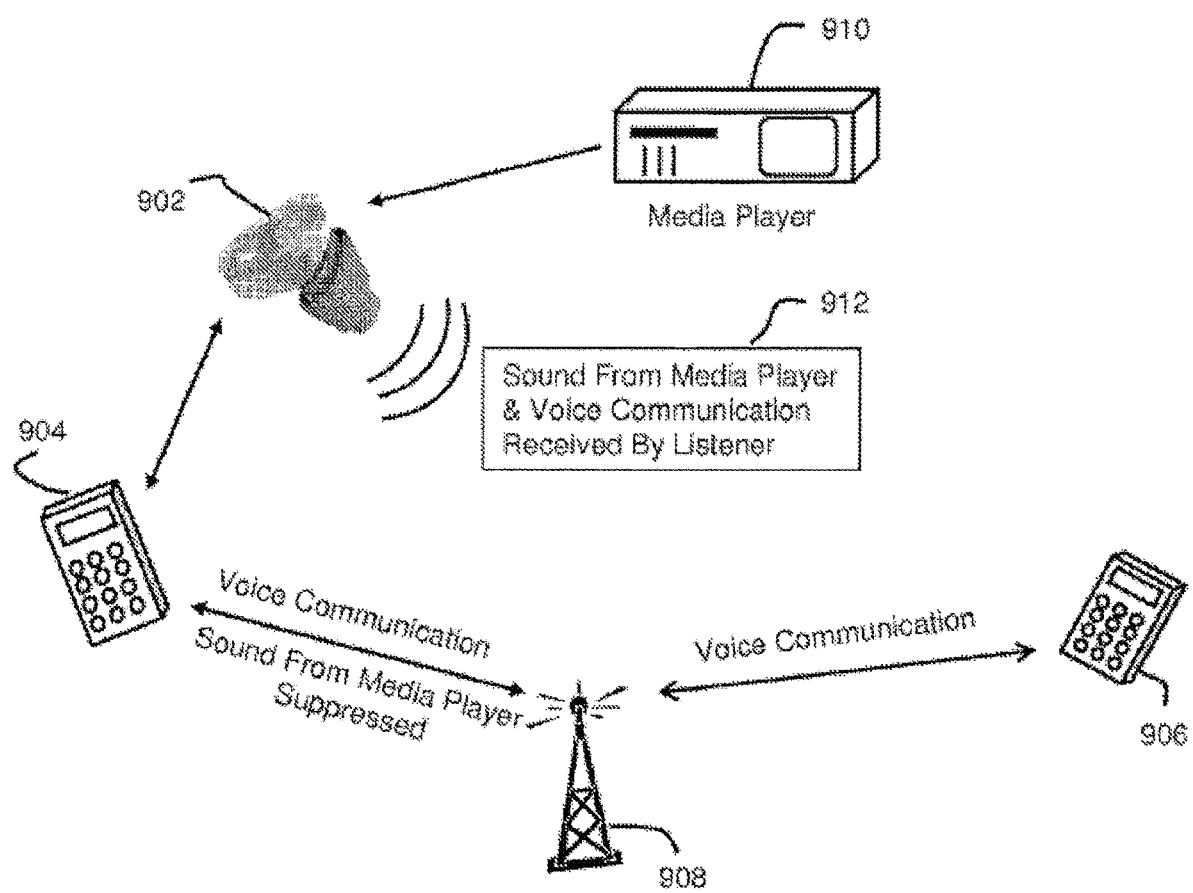
FIG. 9 illustrates that a user can be listening to audio content while in voice communication with a remote communication device in accordance with an exemplary embodiment.

Referring to FIG. 9, a user can be listening to audio content while in voice communication with a user of device 906 in accordance with an exemplary embodiment. The user of communication device 906 does not hear the audio content in the voice communication. An earpiece 902 is coupled for receiving audio content from a media player 910. As shown, earpiece 902 receives the media content directly from media player 910 via a wired or wireless connection. Alternately, earpiece 902 can receive the audio content through communication device 904. The audio content can be music, media content, or other audio content that the user of earpiece 902 wants to hear.

Communication device 904 is paired with earpiece 902. In at least one exemplary embodiment, the audio content provided by media player 910 is uninterrupted by a call from the user of communication device 906. In at least one exemplary embodiment, the volume of the audio content can be automatically adjusted to a predetermined level (defined by the user) that would allow voice communication with the user of device 906 via network 908. For example, the volume could be lowered for the user to hear that a call is incoming and further adjust the volume if the call is taken. In the reference suppression mode 912, the audio content is the reference signal. Earpiece 902 suppresses the audio content from a communication signal being sent to the user of device 906. Alternately, device 904 can suppress the audio content from the transmitted communication signal if it has access to the reference signal using the method described hereinbelow. Thus, the user of device 904 can continue to listen to a ball game, hear a news bulletin, or enjoy music while in communication with others and the audio content is not transmitted to those in communication with device 904.

Referring back to FIG. 6, a switch 624 includes an input 614 coupled to a source 1, an input 616 coupled to a source 2, an output 626, an output 628, an output 630 and control signals 632. Source 1 and source 2 are signals such as music, media content, voice communication, or other audio content. Control signals configure switch 624 for providing source 1, source 2, or a combination of source 1 and source 2 at each output 626, 628, and 630.

In the first example disclosed above, a user of the system initiates a conference call with two other people. Source 1 is a voice communication from a first caller. Source 2 is a voice communication from a second caller. The conference call initiator sets up the call on the system so that the first caller does not hear the voice of the second caller. The system configures switch 624 such that the first and second caller voice communication is mixed with an electronic ambient signal 426 and is provided as mixed signal 323 to ECR 125. ECR 125 provides the acoustic audio content 603 that includes the voices of the first and second callers. Thus, the call initiator hears both the callers. Switch 624 is configured such that output 628 is coupled to source 2 which is the second caller voice communication. The second caller voice communication is the reference signal for adaptive filter 610. The adaptive filter 610, upon learning the ECTF by an adaptive process can suppress the second caller voice of the acoustic audio content 603 (e.g., output mixed signal 323) in the electronic internal signal 410 (z(n)). It subtracts the second caller estimate {tilde over (y)}(n) from the electronic internal signal 410 to produce the modified electronic internal signal e(n) 412. Thus, the modified electronic signal 1 will include the voice of the initiator of the conference call but not the second caller. The modified electronic signal 1 is transmitted to the first caller.

The system is set up for the second caller to hear the entire conversation. Output 630 of switch 624 couples to the adaptive filter 612. No reference signal is provided to adaptive filter 612 so nothing in electronic internal signal 410 is suppressed. Alternately, adaptive filter 612 can be disabled. Modified electronic signal 2 is electronic internal signal 410 that includes all of the voice communication. The modified electronic signal 2 is transmitted to the second caller.

In the second example disclosed above, a user is listening to audio content such as music when receiving a call. The user can listen to the audio content while taking the call without the caller hearing the audio content. A second modified electronic signal 2 is not required so adaptive filter 612 is disabled. Source 1 couples to a media player or other audio source. For illustrative purposes, source 1 is music from a media player. Source 2 is the voice communication signal from a remote caller. Control signals 632 enable switch 624 for providing source 1 and source 2 at the output 626. The music signal and the voice communication signal at output 626 are mixed with the electronic ambient signal 426 forming mixed signal 323. Mixed signal 323 is provided to ECR 125. ECR 125 outputs acoustic audio content 603 which includes the music and the voice communication from the remote caller.

Switch 624 is configured such that output 628 is coupled to source 1 which is the music signal. The music signal is the reference signal for adaptive filter 610. The adaptive filter 610, upon learning the ECTF by an adaptive process can suppress the music signal of the acoustic audio content 603 (e.g., output mixed signal 323) in the electronic internal signal 410 (z(n)). It subtracts the music signal estimate {tilde over (y)}(n) from the electronic internal signal 410 to produce the modified electronic internal signal e(n) 412. Thus, the modified electronic signal 1 will include the voice of the initiator of the conference call but not the music. The modified electronic signal 1 is transmitted to the first caller.

The voice decision logic 620 analyzes the modified electronic signal 412 e(n) and the electronic ambient signal 426 to produce a voice activity level 622, .alpha. The voice activity level .alpha. identifies a probability that the user is speaking, for example, when the user is using the earpiece for two way voice communication. The voice activity level 622 can also indicate a degree of voicing (e.g., periodicity, amplitude), When the user is speaking, voice is captured externally from acoustic ambient signal 424 by the ASM 111 in the ambient environment and also by the ECM 123 in the ear canal. The voice decision logic 620 provides the voice activity level .alpha. to the acoustic management module 201 as an input parameter for mixing the ASM 111 and ECM 123 signals. Briefly referring back to FIG. 4, the acoustic management module 201 performs the mixing as a function of the voice activity level .alpha. and the background noise level (see G=f(BNL)+f(VAL)).

For instance, at low background noise levels and low voice activity levels, the acoustic management module 201 amplifies the electronic ambient signal 426 from the ASM 111 relative to the electronic internal signal 410 from the ECM 123 in producing the mixed signal 323. At medium background noise levels and medium voice activity levels, the acoustic management module 201 attenuates low frequencies in the electronic ambient signal 426 and attenuates high frequencies in the electronic internal signal 410. At high background noise levels and high voice activity levels, the acoustic management module 201 amplifies the electronic internal signal 410 from the ECM 123 relative to the electronic ambient signal 426 from the ASM 111 in producing the mixed signal. The acoustic management module 201 can additionally apply frequency specific filters based on the characteristics of the background noise.

Figure 7:
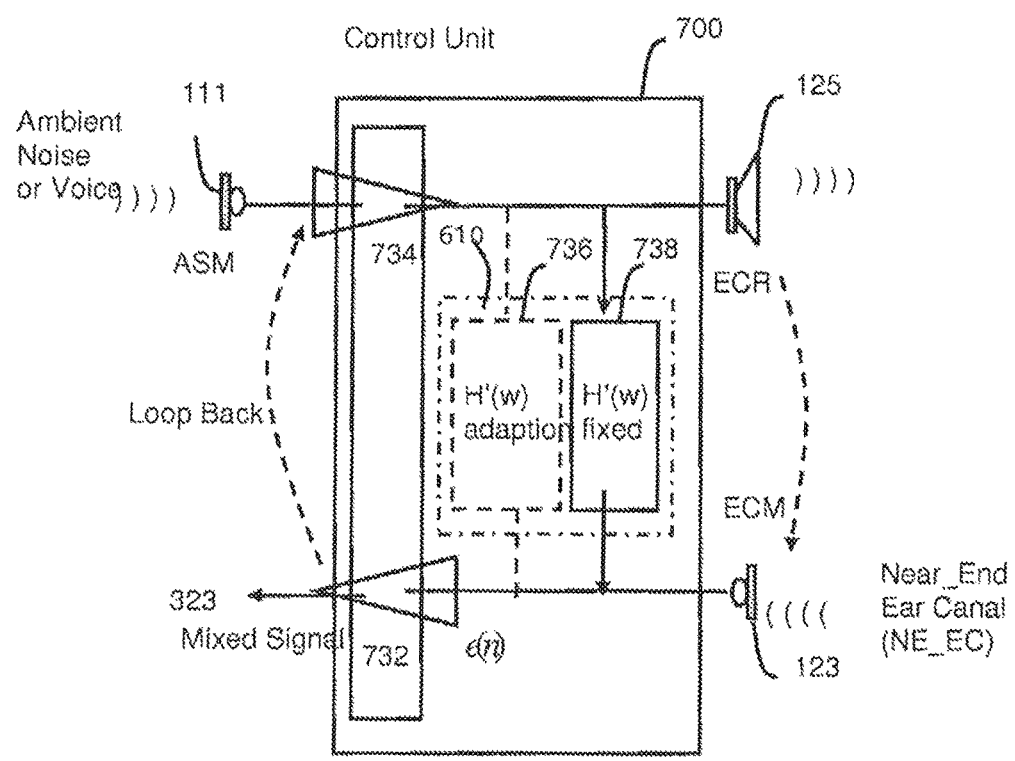
FIG. 7 is a schematic of a control unit for controlling adaptation of a first set and second set of filter coefficients of an echo suppressor for in-ear canal echo suppression in accordance with an exemplary embodiment.

FIG. 7 is a schematic of a control unit 700 for controlling adaptation of a first set (736) and a second set (738) of filter coefficients of the adaptive filter 610 for in-ear canal echo suppression in accordance with an exemplary embodiment. The description hereinbelow also applies to adaptive filter 612. Briefly, the control unit 700 illustrates a freezing (fixing) of weights in upon detection of spoken voice. The adaptive filter 610 resumes weight adaptation when e(n) is low, and freezes weights when e(n) is high signifying presence of spoken voice.

When the user is not speaking, the ECR 125 can pass through ambient sound captured at the ASM 111, thereby allowing the user to hear environmental ambient sounds. In an echo suppression mode, the adaptive filter 610 models an ECTF and suppresses an echo of the mixed signal 323 that is looped back to the ECR 125 by way of the ASM 111 (see dotted line Loop Back path). When the user is not speaking, the suppressor continually adapts to model the ECTF. When the ECTF is properly modeled, the adaptive filter 610 produces a modified internal electronic signal e(n) that is low in amplitude level (i.e, low in error). The suppressor adapts the weights to keep the error signal low. When the user speaks, the suppressor however initially produces a high-level e(n) (e.g., the error signal increases). This happens since the speaker's voice is uncorrelated with the audio signal played out the ECR 125, which disrupts the ECTF modeling ability of adaptive filter 610.

The control unit 700 upon detecting a rise in e(n), freezes the weights of the adaptive filter 610 to produce a fixed filter H'(w) fixed 738. Upon detecting the rise in e(n) the control unit adjusts the gain 734 for the ASM signal and the gain 732 for the mixed signal 323 that is looped back to the ECR 125. The mixed signal 323 fed back to the ECR 125 permits the user to hear themself speak. Although the weights are frozen when the user is speaking, a second filter H'(w) 736 continually adapts the weights for generating a second e(n) that is used to determine presence of spoken voice. That is, the control unit 700 monitors the second error signal e(n) produced by the second filter 736 for monitoring a presence of the spoken voice.

The first error signal e(n) (in a parallel path) generated by the first filter 738 is used as the mixed signal 323. The first error signal contains primarily the spoken voice since the ECTF model has been fixed due to the weights. That is, the second (adaptive) filter is used to monitor a presence of spoken voice, and the first (fixed) filter is used to generate the mixed signal 323.

Upon detecting a fall of e(n), the control unit restores the gains 734 and 732 and unfreezes the weights of the suppressor, and the first filter H'(w) 738 returns to being an adaptive filter. The second filter H'(w) 736 remains on stand-by until spoken voice is detected, and at which point, the first filter H'(w) 738 goes fixed, and the second filter H'(w) 736 begins adaptation for producing the e(n) signal that is monitored for voice activity. Notably, the control unit 700 monitors e(n) from the first filter 738 or the second filter 736 for changes in amplitude to determine when spoken voice is detected based on the state of voice activity.

Figure 10:
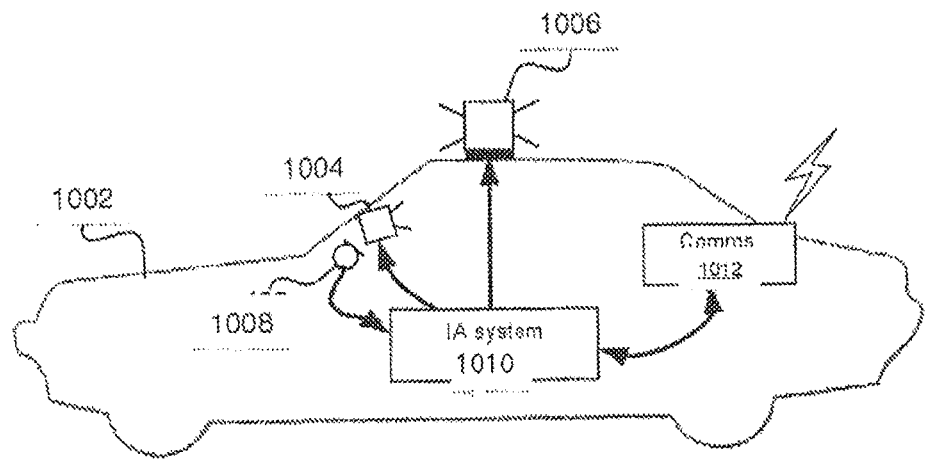
FIG. 10 is an illustration of a system for suppressing a siren or acoustic signal from a communication signal in accordance with an exemplary embodiment.

FIG. 10 is an illustration of a system for suppressing a siren or acoustic signal from a communication signal in accordance with an exemplary embodiment. In general, an emergency vehicle such as a police car, military vehicle, fire truck, or ambulance is a noisy environment. Typically, the vehicle has a loud siren or horn that is played periodically in an emergency situation to alert people that the vehicle is approaching. The siren is of sufficient loudness that it penetrates the cabin of the vehicle where it is picked up by a communication device being used. The siren can make the intelligibility of the speech difficult to understand on the receiving end of the communication. For example, an ambulance medical technician is rapidly telling a hospital the condition of a patient while the siren is blaring in the background. Removing the siren from the communication would allow the speech to be heard with clarity and allow concise recognition of the information being provided.

In at least one exemplary embodiment, a system for a vehicle 1002 comprises a transducer 1006 for emitting an acoustic signal (e.g. siren), a cabin loudspeaker 1004, an "invisible audio" (IA) system 1010, a communication system 1012, and a microphone 1008. The siren acoustic component detected by cabin microphone 1008 is removed by the "Invisible Audio" (IA) system 1010 before the voice communication signal is transmitted to a remote party via communication system 1012. Removing the siren or acoustic signal increases the intelligibility of the transmitted voice communication signal to a remote party, e.g. an emergency call centre. In another embodiment, warning signals that can be reproduced with cabin loudspeaker 1004, such as voice audio signals from other calling parties or vehicle warning systems, can also be removed (or attenuated) by the IA system 1010.

Figure 11:
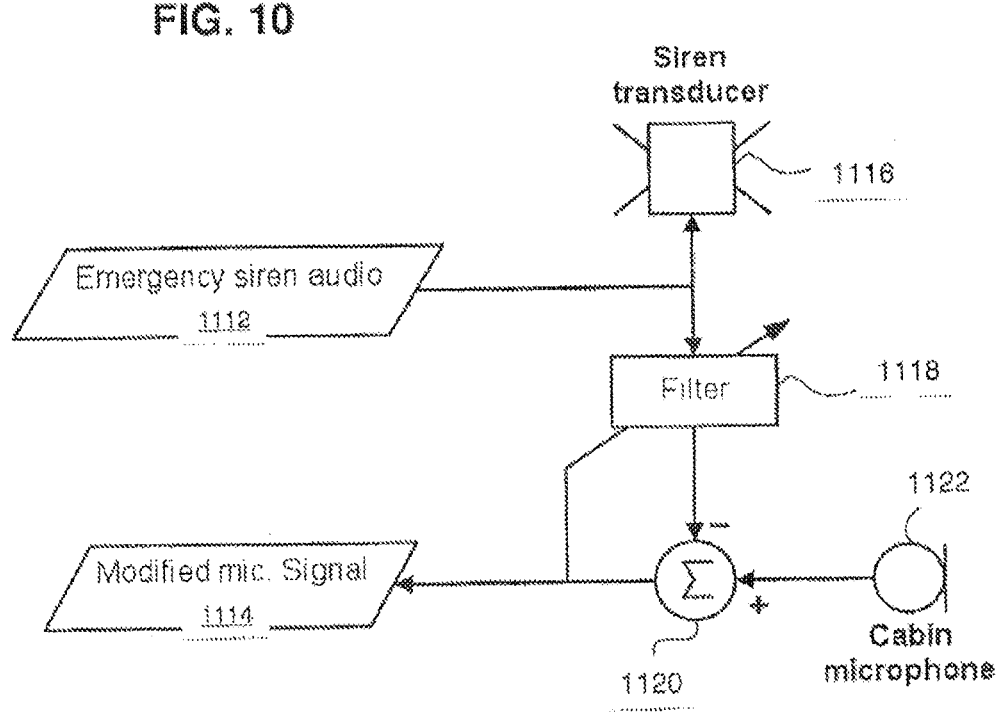
FIG. 11 is a block diagram of the invisible audio system of FIG. 10 for suppressing the siren or acoustic signal in accordance with an exemplary embodiment.

FIG. 11 is a block diagram of the invisible audio system of FIG. 10 for suppressing the siren or acoustic signal in accordance with an exemplary embodiment. An emergency siren audio signal 1112 can be generated either algorithmically using a digital signal processing system, or can be acquired from computer readable memory, and is emitted using acoustic siren transducer 1116 (e.g. a loudspeaker mounted on the outside of the emergency vehicle). The emergency siren audio signal 1112 is further filtered using filter 1118 and subtracted from the cabin microphone signal 1122 using signal subtraction unit 1120, to generate a modified microphone signal 1114. In at least one exemplary embodiment, filter 1118 is a fixed FIR-type digital filter, where the impulse response approximates the acoustic impulse response between the siren transducer 1116 and cabin microphone 1122. In another exemplary embodiment, filter 1118 is an adaptive filter, where the filter coefficients are updated over time to approximate the acoustic impulse response between the siren transducer 1116 and cabin microphone 1122. The adaptive filter can be updated according to one of many well-known adaptive filter algorithms, such as the normalized least-mean-square algorithm (NLMS) or recursive least-mean-square algorithm. The modified microphone signal 1114 can then be further transmitted to a remote party, such as an emergency caller control centre with better intelligibility and clarity.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

We claim:

1. A first communication device, comprising:
a memory that stores instructions; and
a processor that executes the instructions to perform operations, the operations comprising:
    selecting to suppress a voice communication of a second communication device on a call with the first communication device;
        producing acoustic audio content based on audio content associated with the call that is delivered via an ear canal receiver of the first communication device;
        providing, by utilizing an ear canal microphone of the first communication device, an electronic internal signal based on the acoustic audio content to an adaptive filter coupled to a reference signal; and
        generating, by utilizing the adaptive filter, a modified electronic signal based on the electronic internal signal and the reference signal; and
    suppressing the voice communication of the second communication device in the modified electronic signal.

2. The first communication device of claim 1, wherein the operations further comprise providing the modified electronic signal to a third communication device on the call after suppressing the voice communication in the modified electronic signal.

3. The first communication device of claim 1, wherein the operations further comprise initiating a conference call using the first communication device, the second communication device, or a combination thereof.

4. The first communication device of claim 1, wherein the operations further comprise enabling a conference call initiator to preselect a caller to suppress.

5. The first communication device of claim 1, wherein the operations further comprise adjusting volume of the audio content to a predetermined level.

6. The first communication device of claim 1, wherein the operations further comprise suppressing, by utilizing an echo suppressor, feedback associated with a spoken voice received from the ear canal receiver.

7. The first communication device of claim 1, wherein the operations further comprise determining a background noise level of an environment associated with the first communication device.

8. The first communication device of claim 1, wherein the operations further comprise mixing an audio signal captured at an ambient sound microphone of the first communication device with an audio signal captured at the ear canal microphone of the first communication device to produce a mixed signal.

9. The first communication device of claim 8, wherein the operations further comprise providing the mixed signal to a voice recognition system, a voice dictation system, a voice recorder, or a combination thereof.

10. The first communication device of claim 8, wherein the operations further comprise producing an echo estimate based on the electronic internal signal and the mixed signal.

11. A method, comprising:
   selecting to suppress a voice communication of a second communication device on a call with a first communication device;
   generating acoustic audio content based on audio content associated with the call that is delivered via an ear canal receiver of the first communication device;
   providing, by utilizing an ear canal microphone of the first communication device, an electronic internal signal based on the acoustic audio content to an adaptive filter coupled to a reference signal; and
   generating, by utilizing the adaptive filter, a modified electronic signal based on the electronic internal signal and the reference signal; and
   suppressing the voice communication of the second communication device in the modified electronic signal.

12. The method of claim 11, further comprising modeling an ear canal transfer function by utilizing the adaptive filter.

13. The method of claim 11, further comprising providing a voice associated with the call in the modified electronic signal.

14. The method of claim 11, further comprising managing an echo feedback condition affecting a voice activity level determined in an environment associated with the first communication device.

15. The method of claim 11, further comprising subtracting an echo estimate from the electronic internal signal to produce the modified electronic signal.

16. The method of claim 11, further comprising further comprise suppressing feedback associated with a spoken voice received from the ear canal receiver.

17. The method of claim 11, further comprising transmitting the modified electronic signal to a third communication device.

18. The method of claim 11, further comprising preserving a spoken voice occurring during the call when generating the modified electronic signal.

19. The method of claim 11, further comprising adapting a first set of filter coefficients of a Least Mean Squares filter to model an inner ear-canal microphone transfer function of a first user associated with the first communication device.

20. A first communication device, comprising:
   a memory that stores instructions; and
   a processor that executes the instructions to perform operations, the operations comprising:
      producing acoustic audio content based on audio content associated with a call that is delivered via an ear canal receiver of a first communication device on a call with a second communication device;
      providing, by utilizing an ear canal microphone of the first communication device, an electronic internal signal based on the acoustic audio content to an adaptive filter coupled to a reference signal; and
      generating, by utilizing the adaptive filter, a modified electronic signal based on the electronic internal signal and the reference signal; and
      suppressing a voice communication of the second communication device in the modified electronic signal.

* * * * *